Feb. 19, 1935.  E. R. NOLL  1,991,621

HIGH PRESSURE GLOBE VALVE

Filed March 2, 1932

Inventor

Elmer R. Noll

By Murray and Zugelter

Attorneys

Patented Feb. 19, 1935

1,991,621

UNITED STATES PATENT OFFICE 1,991,621

HIGH PRESSURE GLOBE VALVE

Elmer R. Noll, Cincinnati, Ohio, assignor to The William Powell Company, Cincinnati, Ohio, a corporation of Ohio Application March 2, 1932, Serial No. 596,318

4 Claims. (Cl. 251—37)

This invention relates to a globe valve for high temperature and high pressure control, which is especially adapted for use in controlling the flow of crude oil and products extracted therefrom during refining.

An object of the invention is to provide a globe type of valve for properly controlling flow of materials of the general character above referred to which disable ordinary types of valves.

Another object is to provide a valve of the above stated character, the seats of which may be forced to a tight closure in the presence of solidified cokes or hardened substances which cling to and harden upon the seats of valves used in controlling said substances.

A further object is to provide a valve with simple and inexpensive means for forcing the seats together and effecting a rotary or grinding movement exceeding in extent the rotary grinding movement common to ordinary globe or disc type valves.

These and other objects are attained by the means described herein and disclosed in the accompanying drawing, in which.

Figures 1, 2:
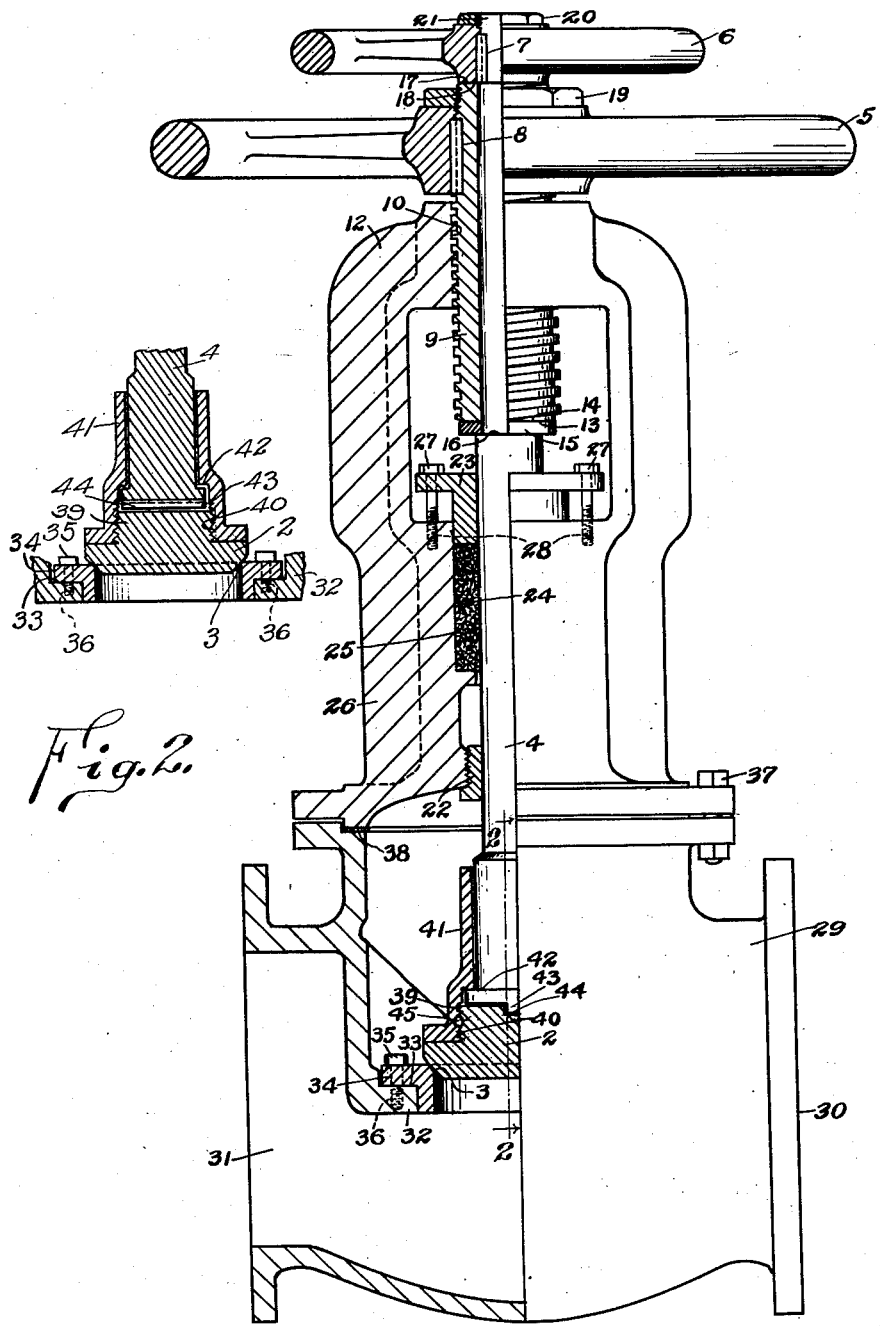
Fig. 1 is an elevational view of the improved valve showing half thereof in cross-section.
Fig. 2 is a fragmental cross-sectional view taken on line 2—2 of Fig. 1.

Up to the present time great difficulty was encountered in controlling the flow of the crude oil, hot pitch and tar, and similar substances which require handling and pipe line control in refineries and like establishments. It is known that substances such as are above set forth, contain certain elements which harden, precipitate and solidify while contained in valve controlled pipe lines. The hard coke which is found in the substance contained in the pipe lines solidifies and clings tenaciously to the seats of the control valves, thereby precluding the formation of a tight closure between the seats of the valves. In accordance with the present invention, means are provided whereby the turning movement of the valve disc may be performed independently of the linear advancement thereof toward its seat. Thus, the valve disc may be advanced to its seat and rotated independently any number of times necessary for the formation of a tight closure at the valve seats.

In the drawing, the character 2 indicates a valve disc which is adapted to engage the valve seat 3 and to rotate with the stem 4. Advancement of the valve disc toward its seat 3 is effected by means of the actuating means or hand wheel 5, whereas independent rotational movement of the disc is afforded by means of the actuating means or hand wheel 6 which is keyed as at 7 to the upper end of the stem. The hand wheel 5 is keyed, as at 8, to the threaded sleeve 9 which threadedly engages the threaded bore 10 in the yoke 12. The lower abutting surface 13 of the threaded sleeve abuts the upper bearing surface 14 of a thrust collar 15 which is supported upon a shoulder 16 of the stem 4. The uppermost bearing surface 17 of the threaded sleeve is adapted to abut the bearing face 18 provided by the hand wheel 6. The hand wheel 5 is locked to the threaded sleeve by means of the lock nut 19. Thus it should readily be apparent that the valve disc may be lifted from its seat by rotating the hand wheel 5 and the threaded sleeve, and that rotation thereof in the opposite direction will seat the disc. After the disc is thereby seated, the hand wheel 6 may be actuated for rotating the stem and the disc for removing or grinding away any coke or other foreign substance that may attach itself to either the disc or member 3 in the region of their line of contact. In instances where the valve has been permitted to remain open for a long period of time, a great number of alternate actuations of the hand wheels 5 and 6 may be required to secure a proper seating of the valve.

The disc 2 and the valve seat member 3 preferably are made of a very hard material which will not readily score under the grinding action imparted by means of the hand wheel 6.

The character 20 indicates a lock nut for locking the hand wheel 6 to the upper end 21 of the stem. At 22 is indicated a bushing for receiving and guiding the lower portion of the stem, and above the bushing there is provided a gland 23 which compresses the packing 24 between the stem and the bore 25 provided in the upper housing 26. The gland preferably is maintained in adjusted positions by means of the screws 27 which engage in threaded bores 28 formed at the base of the yoke 12.

The lower housing member 29 is provided with the usual ports 30 and 31 between which is formed the dividing wall 32. Said dividing wall preferably is provided with an annular shoulder 33 which supports the flange 34 of the seat member 3, these parts being secured one to the other by means of screws 35 passing through the flange 34 and engaging in threaded bores 36 in the dividing wall. When it is considered necessary to remove the seat member 3, it is necessary only to remove the housing bolts 37, whereupon the housings 26 and 29 may be separated and a wrench applied to the screws 35 for removal of the seat member 3. Reference character 38 indicates an annular gasket which renders the valve leak-proof at the joint between the two housing members.

The circular valve disc 2 preferably is provided with a concentric threaded portion 39 which is adapted to enter and engage in the threaded bore 40 of a disc holder 41 which slidably surrounds the stem 4 and bears upon a shoulder 42 formed integrally with the stem. The lower end of the stem includes an integral transverse narrow abutment or lug 43 which cooperates with a suitable diametral shallow depression 44 formed in the top of the threaded portion 39. After disposition of the disc holder 41 upon the stem and screwing the disc into the disc holder with the abutment 43 and depression 44 in registering relationship, a pin 45 may be inserted through the members 41 and 39 to lock them against relative rotational movement. The shoulder 42 may be permitted to have a slight amount of play between the parts 41 and 39 to provide for a slight universal movement of the valve disc.

The operation of the device is as follows: assuming that the valve is in a fully closed position as shown in the drawing, the valve may be opened by simply rotating the hand wheel 5 and the threaded sleeve 9 attached thereto. The lifting of the disc is effected by reason of the abutment 17 of the threaded sleeve forcibly engaging the abutment 18 of the small hand wheel 6. Should it be desired to close the valve after the formation of coke or other hard substance upon the seats 2 and 3, it is necessary only to rotate the hand wheel 5 sufficiently to place the seats in contacting relationship, after which the hand wheel 6 may be rotated for turning the stem and the disc in order to remove or grind away any substance adhering to the seats. As stated before, should the coke become very strongly attached to the seat members, it might be necessary to manipulate the hand wheel 6 a great number of times and to supplement that action with an occasional tightening of the seats by means of the hand wheel 5. It should readily be apparent that the parts 35 and 27 are easily accessible for effecting renewal and adjustment of the parts 3 and 23, respectively, which renders the valve highly desirable in the work for which it is adapted. The actuating means 5 and 6 may be of any desired configuration.

It is to be understood that various modifications and changes in structural details of the device may be made, within the scope of the appended claims, without departing from the spirit of the invention.

What is claimed is:

1. In a valve of the character described for the control of pitchy crude oil products, the combination of a pair of connectible housing members, an annular valve seat in one of said members, a longitudinal bore through the other housing member, a yoke having a threaded opening at its top aligned axially with the bore of the housing, a valve stem extending through the housing bore and the threaded opening of the yoke, a slidingly fitted valve disc holder on the lower end of the stem, a valve disc, and means connecting said disc and holder for slight universal movement rotationally and axially relative to the stem, an abutment on the stem intermediate the housing bore and the enlarged opening of the yoke, a cylindrical sleeve threaded exteriorly for engaging the threaded opening of the yoke, said sleeve having an abutment thereon for frictionally engaging the abutment on the stem which it encircles, an actuating means fixed upon the cylindrical sleeve exteriorly of the yoke, and a second actuating means similar in shape but of smaller size than the first actuating means and permanently fixed upon the stem and arranged to frictionally abut the opposite end of the cylindrical sleeve, whereby the turning action of the valve and the lifting action thereof may accurately be effected simultaneously, due to the correspondency of the actuating means, to break any coke seal between the valve seats, whereas upon closing the valve the turning and lowering actions conveniently may be effected alternately.

2. In a valve of the character described for the control of pitchy crude oil products the combination of a pair of connectible housing members, an annular valve seat in one of said members, a longitudinal bore through the other housing member, a yoke having a threaded opening at its top aligned axially with the bore of the housing, a valve stem extending through the housing bore and the threaded opening of the yoke, a valve disc on the lower end of the stem mounted for slight universal movement but arranged for movement rotationally and axially of the stem, an abutment on the stem, a cylindrical stem-advancing sleeve threaded exteriorly for engaging the threaded opening of the yoke, said cylindrical sleeve having an abutment thereon for frictionally engaging the abutment of the stem which it encircles, an actuating means fixed upon the sleeve exteriorly of the yoke, and a second actuating means similar in shape but of smaller size than the first actuating means and permanently fixed upon the stem and arranged to frictionally abut the opposite end of the cylindrical sleeve, whereby the turning action of the valve and the lifting action thereof may be accurately effected simultaneously due to the correspondency of the actuating means, to break any coke seal between the valve seats, whereas upon closing the valve the turning and lowering actions conveniently may be effected alternately.

3. In a valve of the character described the combination of a housing, a valve seat fixed in the housing, a valve stem, a cooperative movable valve member having a substantially flat upper bearing sruface provided with a transverse diametral shallow groove of such narrow width as to leave a substantial flat area on said bearing surface at each side of the groove, an annular shoulder on the movable valve member and a contiguous externally threaded portion, a transverse narrow lug on an end of the valve stem adapted for reception in the diametral shallow groove of the valve member, an annular shoulder on the stem adjacent to the lug, and a holder for the valve member and comprising a sleeve portion slidably surrounding the stem said portion having an annular inner abutment for engaging the annular shoulder of the stem and maintaining said shoulder in substantial contacting relationship with the said flat upper bearing surfaces of the valve member, an internally threaded flange on the holder for abutment upon the annular shoulder of the valve member when the said internal threads are engaged with the threads of the valve member, and means including an externally threaded sleeve and a sleeve abutting shoulder on the stem arranged concentrically with one another and rotatable relatively for independently rotating and advancing the movable valve member toward the fixed valve seat, and an internally threaded yoke on the housing for threaded engagement with the externally threaded sleeve 4. In a valve of the character described the combination of a housing, a valve seat fixed in the housing, a valve stem, a cooperative movable valve member having a substantially flat upper bearing surface provided with a transverse diametral shallow groove of such narrow width as to leave a substantial flat area on said bearing surface at each side of the groove, an annular shoulder on the movable valve member and a contiguous externally threaded portion, a transverse narrow lug on an end of the valve stem adapted for reception in the diametral shallow groove of the valve member, an annular shoulder on the stem adjacent to the lug, and a holder for the valve member comprising an elongated sleeve portion slidably surrounding the greater area of the stem within the interior of the sleeve portion said portion having an annular inner abutment for engaging the annular shoulder of the stem and maintaining said shoulder in substantial contacting relationship with the said flat upper bearing surfaces of the valve member, an internally threaded flange on the holder for abutment upon the annular shoulder of the valve member when the said internal threads are engaged with the threads of the valve member, a threaded axially movable sleeve, a threaded support for said sleeve, and a sleeve engageable abutment on the stem arranged concentrically, the sleeve and stem being rotatable relatively for independently rotating and advancing the movable valve member toward the fixed valve seat.

ELMER R. NOLL.